United States Patent
Brygo et al.

(10) Patent No.: US 11,327,287 B2
(45) Date of Patent: May 10, 2022

(54) MICROSCOPE

(71) Applicant: BERTIN TECHNOLOGIES, Montigny le Bretonneux (FR)

(72) Inventors: François Brygo, Charleval (FR); David Anthoine, Rognes (FR)

(73) Assignee: BERTIN TECHNOLOGIES, Montigny le Bretonneux (FR)

( * ) Notice: Subject to any disclaimer, the term of this patent is extended or adjusted under 35 U.S.C. 154(b) by 695 days.

(21) Appl. No.: 16/312,640

(22) PCT Filed: Jun. 22, 2017

(86) PCT No.: PCT/FR2017/051672
§ 371 (c)(1),
(2) Date: Jun. 3, 2019

(87) PCT Pub. No.: WO2017/220943
PCT Pub. Date: Dec. 28, 2017

(65) Prior Publication Data
US 2019/0285866 A1    Sep. 19, 2019

(30) Foreign Application Priority Data

Jun. 23, 2016 (FR) ..................... 1655888

(51) Int. Cl.
*G02B 21/24* (2006.01)
*G02B 7/00* (2021.01)
(Continued)

(52) U.S. Cl.
CPC ........... *G02B 21/248* (2013.01); *G02B 7/006* (2013.01); *G02B 7/16* (2013.01); *G02B 21/0016* (2013.01);
(Continued)

(58) Field of Classification Search
CPC ........ G02B 21/248; G02B 7/006; G02B 7/16; G02B 21/0016; G02B 21/0076;
(Continued)

(56) References Cited

U.S. PATENT DOCUMENTS

| 6,414,805 B1 * | 7/2002 | Reichman | G02B 21/06 359/351 |
| 2008/0043324 A1 * | 2/2008 | Lytle | G02B 27/1073 359/388 |

(Continued)

FOREIGN PATENT DOCUMENTS

| CN | 103210337 A | 7/2013 |
| WO | 2008022139 A2 | 2/2008 |
| WO | 2016026926 A1 | 2/2016 |

OTHER PUBLICATIONS

Chinese Office Action issued in corresponding Chinese Patent Application No. 201780051414.9, dated Nov. 27, 2020, pp. 1-5.
(Continued)

*Primary Examiner* — Robert E. Tallman
(74) *Attorney, Agent, or Firm* — Hauptman Ham, LLP (57) ABSTRACT

A microscope comprising a first turret bearing a plurality of lenses and a second turret bearing a plurality of filtering modules, the first turret and the second turret being borne on the same pivot and mounted to rotate, independently of each other, about this pivot, each lens of the first turret and each filtering module of the second turret being able to be arranged by rotation of the first turret and of the second turret into an active position of use in which a filtering module of the second turret is inserted into the optical path between a lens of the first turret and a detector.

14 Claims, 6 Drawing Sheets

(51) Int. Cl.
  *G02B 7/16* (2021.01)
  *G02B 21/00* (2006.01)
  *G02B 21/06* (2006.01)
  *G02B 21/18* (2006.01)
  *G02B 21/26* (2006.01)

(52) U.S. Cl.
  CPC ......... *G02B 21/0076* (2013.01); *G02B 21/06* (2013.01); *G02B 21/18* (2013.01); *G02B 21/26* (2013.01); *G02B 2207/113* (2013.01)

(58) Field of Classification Search
  CPC ........ G02B 21/06; G02B 21/18; G02B 21/26; G02B 2207/113
  See application file for complete search history.

(56) References Cited

U.S. PATENT DOCUMENTS

| | | | |
|---|---|---|---|
| 2013/0021665 A1 | 1/2013 | Kubek | |
| 2015/0116477 A1* | 4/2015 | Kang | G02B 21/365 348/79 |

OTHER PUBLICATIONS

International Search Report from corresponding International Application No. PCT/FR2017/051672, dated Sep. 18, 2017, pp. 1-2, European Patent Office, Rijswijk, The Netherlands.

* cited by examiner

MICROSCOPE

FIELD

The present invention relates to a microscope for observing a sample, in particular a fluorescence.

TECHNOLOGICAL BACKGROUND

A fluorescence microscope makes it possible for the study of organic and inorganic properties of a sample by using the fluorescence emitted by the sample instead of the light reflected or absorbed by the sample. The fluorescence is based on the principle of spontaneous emission by the sample of a light with a specific wavelength following the excitation of said sample with a specific wavelength. The sample can be naturally fluorescent or be treated with specific compounds, called fluorophores.

Conventionally, a fluorescence microscope comprises lighting means capable of emitting a light beam towards an objective lens then towards a sample. Filtering means are generally interleaved in the optical path of the light coming from the sample and before receiving by observation means.

In the known art, numerous arrangements have been proposed to position the filtering means, the objective lenses and the lighting means relative to one another. However, none of the arrangements proposed are not satisfactory in terms of precision and long-term reliability in use.

In a specific configuration described in document WO2008/022139, it has been proposed to arrange the lighting means and the filtering means in mobile modules. These modules are provided to be brought into an active position of use for the analysis of a sample. This mounting type involves an electrical supply of the lighting means of the mobile member which can prove to be difficult to achieve.

SUMMARY

The invention particularly aims to provide a simple, effective and economic solution to the problems of the prior art described above.

To this end, it proposes a microscope for observing a sample, comprising a first turret supporting a plurality of objective lenses and a second turret supporting a plurality of filtering modules, the first turret and the second turret being supported by one same fixed pivot and mounted in rotation, independently from one another, around this pivot, each objective lens of the first turret and each filtering module of the second turret being capable of being arranged by rotation of the first turret and of the second turret in an active position of use wherein a module of the second turret is interleaved in the optical path between an objective lens of the first turret and a detector.

According to the invention, the magnification objective lenses are mounted in rotation on one same pivot as that supporting the filtering modules which makes it possible to guarantee a better precision to the positioning of the filtering modules and objective lenses in an active position, by removing the imprecisions due to the use of support, fixed independently from one another.

In addition, the use of one same pivot makes it possible to guarantee a maintaining of the precision facing outer impacts, which impact, in the same way, the first turret and the second turret.

In a specific embodiment of the invention, the pivot is tilted obliquely with respect to the vertical in the position of use of the microscope.

Preferably, the second turret is arranged below the first turret. A sample-carrying table is advantageously arranged above the first turret.

According to a characteristic of the invention, each turret is guided in rotation around the pivot by two rolling bearings supported by the pivot.

Also, the second turret can comprise a support plate of the filtering modules mounted around the first and second bearings of the second turret, the first turret could also comprise a support plate of the objective lenses fixed on a ring surrounding the first and second associated bearings.

According to a characteristic of the invention, each filtering module comprises a casing comprising a first opening and a second opening, such that the light emitted by the sample passes through the first opening, then the second opening, the casing of each filtering module supporting a dichroic filter arranged in the first opening and suitable for reflecting the light emitted by the associated lighting module towards an objective lens and making it possible for the light of a predetermined wavelength to pass through the dichroic filter.

In order to remove the excitation wavelength of the light coming from the sample, each filtering module can thus comprise an emission filter capable of rejecting the wavelength of the light source, this emission filter being arranged in the second opening. In practice, this emission filter is a very selective bandpass filter.

According to the invention, the microscope comprises fixed lighting means, capable of emitting a light beam for lighting the sample along a given optical path. These lighting means can be formed by a plurality of lighting modules which are fixed and which are configured to emit light beams of which the wavelengths are different, two by two.

Differently from the prior art, the lighting and filtering functions are decoupled which facilitates the maintenance operations. In addition, the use of fixed lighting means makes it possible to connect them simply to an electrical supply as well as positioning them simply. It is easily understood that the combination of fixed lighting means with mobile filtering means as described above, can be achieved without the first turret and the second turret being necessarily supported by one same pivot.

According to another characteristic of the invention, each lighting module is associated, when functioning, with one single filtering module, a lighting module and the associated filtering module being positioned against one another such that the beam of said lighting module is sent back by the dichroic filter of said filtering module to an objective lens of the first turret, when said filtering module and the objective lens are in an active position.

This arrangement makes it possible to make a lighting module cooperate with a filtering module in the scope of a fluorescence functioning of the microscope.

It is easily understood that the dichroic filters of the filtering modules, needing to send back the excitation light towards an objective lens, are not positioned identically on the second turret with respect to the pivot, since the lighting modules are fixed.

According to a characteristic of the invention, the lighting modules are positioned on a deck in the shape of a circular arch and which is secured to a frame of the microscope.

According to another characteristic of the invention, the second turret can be controlled in rotation by motorised means actuated by means for controlling the active positioning of a filtering module, these controlling means being capable of functioning a given lighting module.

A rotating roller can be coupled in rotation with the first turret, for example by a transmission belt. Thus, the user can position the desired objective lens in an active position by means of the roller, this being directly accessible to a user.

To facilitate a maintenance operation or also to facilitate the use of the microscope, each filtering module can be mounted so that they can be removed on the second turret.

The present document relates also to a lighting module, in particular intended to be used with the microscope such as described above and comprising a tubular body comprising a light source, of the semi-conductive type, at a first end and a lens inserted from a second end opposite the first end onto an annular shoulder inside said body, a filter support being fitted onto the lens by an elastic member that is axially pre-stressed and axially locked by a stop ring of the second end of the body.

In this configuration of the lighting module, the support of the filter is directly locked by an elastic member fitted onto the lens by an axial stop ring. This assembly has proven to be simple and quick to achieve and requires not much handling. In addition, when maintenance must be carried out on the lens, it can be easily replaced by removing beforehand the elastic member, then the filter support. This disassembly does not impact the light source, which remains positioned at the first end of the tubular body.

Finally, the positioning of the lens on an annular shoulder of the tubular body makes it possible for a precise axial positioning of the lens relative to the lighting source, the shoulder supporting the lens being at an invariable distance from the light source.

According to another characteristic, the support comprises an annular segment forming a spacer fitted between a convex face of the lens and the elastic member.

This mounting makes it possible to insert the spacer supporting the filter by an elastic member which is applied on the spacer, the spacer being applied axially on the lens, which does not require screwing and therefore avoids a rotation movement which could scratch the surface of the lens. In addition, this mounting limits the number of parts necessary to secure the lens and the filter in the tubular body, making it possible to obtain a very compact lighting module.

Also, this limiting of the number of parts makes it possible, in addition, to easily respect the axial positioning of the light source, of the lens and of the filter against one another.

Preferably, the annular segment is connected to a cylindrical sleeve extending downstream from the lens, surrounded by the stop ring and supporting a bandpass filter at the opposite end thereof to the lens.

The mounting of the filter on a cylindrical sleeve surrounded by an elastic member for holding the spacer of the support and by the stop ring of the elastic member makes it possible to assemble the different elements of the lighting module simply and quickly, while guaranteeing an optimum compactness of the lighting module.

Also according to another characteristic of the invention, a diaphragm is inserted between the light source and the lens and is made from one single part with the body.

The opening of the diaphragm can have a section flaring towards the second end of the body, preferably truncated. Such a section of the opening, continually increasing towards the bottom, makes it possible to limit the light reflections on the inner face of the opening of the diaphragm. It also makes it possible for a more precise positioning of the diaphragm relative to the lighting source and the optical axis of the lens.

The radially outer periphery of the lens can be inserted in a truncated cross-sectional groove flaring towards the first end of the body, so as to reduce the mechanical stresses applied to the outer periphery of the lens.

In a practical embodiment of the invention, the annular shoulder separates a first upstream body part housing the diaphragm of a second downstream body part housing the lens, the filter support, the elastic member and the stop ring.

BRIEF DESCRIPTION OF THE FIGURES

The invention will be best understood and other details, advantages and characteristics of the invention will appear upon reading the following description, made as a non-limiting example, in reference to the appended drawings, wherein.

DETAILED DESCRIPTION

Figure 1:
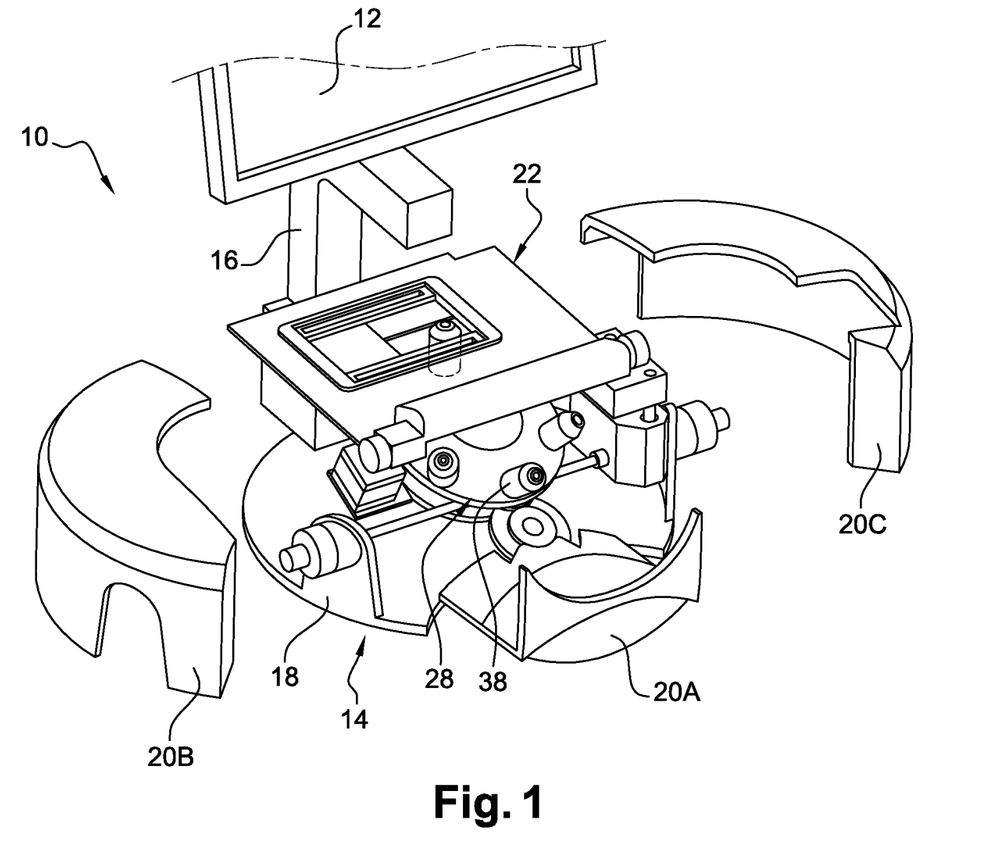
FIG. 1 is a schematic, perspective top view of the microscope according to the invention, the cowling means being as an exploded view.

First, FIG. 1 is referred to, which represents an embodiment example of the microscope 10 according to the invention, this microscope 10 being, for example, intended for the observation of the fluorescence of a sample or also for the observation in transmitted light, possibly by phase contrast of the sample.

As represented in FIG. 1, the microscope 10 mainly comprises:

a touchscreen 12 for displaying and entering data by an operator or user;

a support frame 14 of the screen, comprising an arm 16 or pole supporting the screen 12 and connected to an end opposite the screen with a substantially flat base 18;

cowling means 20A, 20B, 20C supported by the frame 14 and housing a mechanism for positioning objective lenses and filters, lighting means, motorised means, a detector 21, as well as means for controlling the lighting means and the motorised means;

a sample holder table 22 provided with means for moving the sample on the table, this table 22 being arranged above the cowling elements 20A, 20B, 20C.

The microscope 10 can comprise means for adjusting the flatness/stability of the base 18 of the frame 14, these means comprising, for example, threaded rods 24 of which an end is screwed in the base 18 and an opposite end comprises a support disc 26, the screwing depth of each of the threaded rods 24 making it possible to adjust the distance from the base to the discs 26 to adjust the flatness of the base and therefore of the frame 14 of the microscope 10.

The cowling means comprise three separate elements 20A, 20B, 20C, a first side element 20B, a second side element 20C and a front cowling element 20A, i.e. arranged opposite an operator when they use the microscope 10. The front cowling 20A can be removed by the user in order to make it possible for an access to the objective lenses as will appear more clearly below in the description.

The mechanism for positioning the objective lenses and filters comprises a first turret 28 and a second turret 30 supported by one same fixed pivot 32 and mounted in rotation around this pivot 32 (FIGS. 4 to 9). Each of the first 28 and second 30 turrets is capable of rotating independently from one another around the pivot. As can be seen, the pivot 32 is formed by a bar and is tilted obliquely with respect to the vertical. More specifically, along the three orthogonal directions X, Y and Z of the space (FIG. 2), the axis 34 of the pivot 32 is contained in the plane XZ, i.e. a plane extending from front to rear, and the norm thereof in the plane XZ which is oriented towards the front is directed from top to bottom. The axis 34 of the pivot 32 can be tilted by an angle of between 5 and 60°, preferably 30° with respect to the vertical axis of the axis Z. This angle is selected to make it possible for a simple access to the objective lenses of the first turret 28 by removing the cowling or cap element 20A. It is easily understood that the base 18 of the frame 14 extends into the plane XY, when the microscope 10 is in the position of use.

It is noted that the axis of the first turret 28 and the axis of the second turret 30 are combined in the mounting position with the axis 34 of the pivot 32 such that the same reference is applied.

As represented more specifically in FIGS. 2 and 4, the second turret 30 is arranged below the first turret 28 such that the first turret 28 can be qualified as an upper turret and the second turret 30 can be qualified as a lower turret. The first turret 30 comprises a plate 36 comprising openings, regularly distributed about the axis 34 of the first turret 28 and wherein are inserted magnification/focalisation objective lenses 38. The second turret 30 also comprises a plate 40 comprising openings, regularly distributed about the axis 34 of the second turret 30 and wherein are inserted filtering modules 42. The specific positioning of the filtering modules 42 will appear more clearly below in the description in reference to FIGS. 10 and 12.

Figure 4:
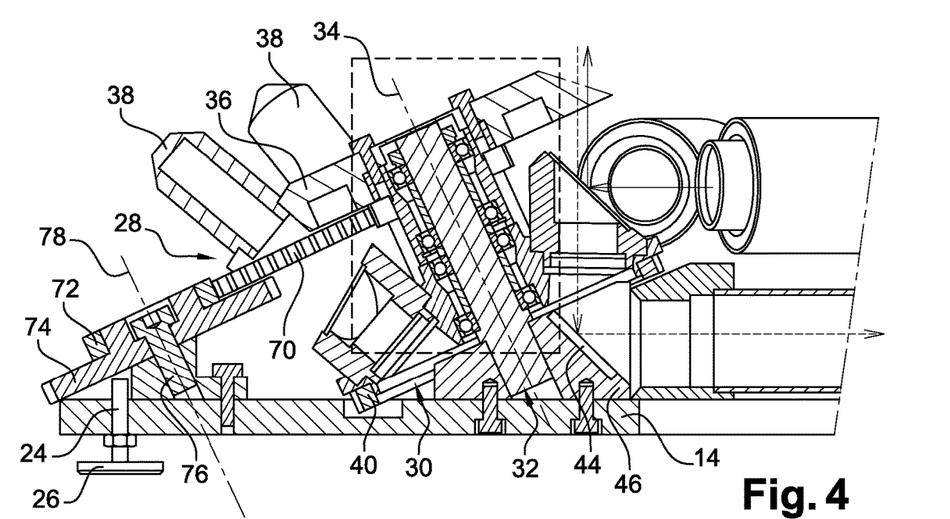
FIG. 4 is a schematic, cross-sectional view of the microscope according to the invention, along a vertical plane extending from the front and rear and containing the pivot.

As is represented in FIG. 4, each filtering module 42 and each objective lens is capable of being brought into an active position wherein a filtering module 42 is inserted in the optical path between an objective lens 38 of the first turret 28 and an optically reflective surface 44 supported by a base 46.

Figures 5, 6:
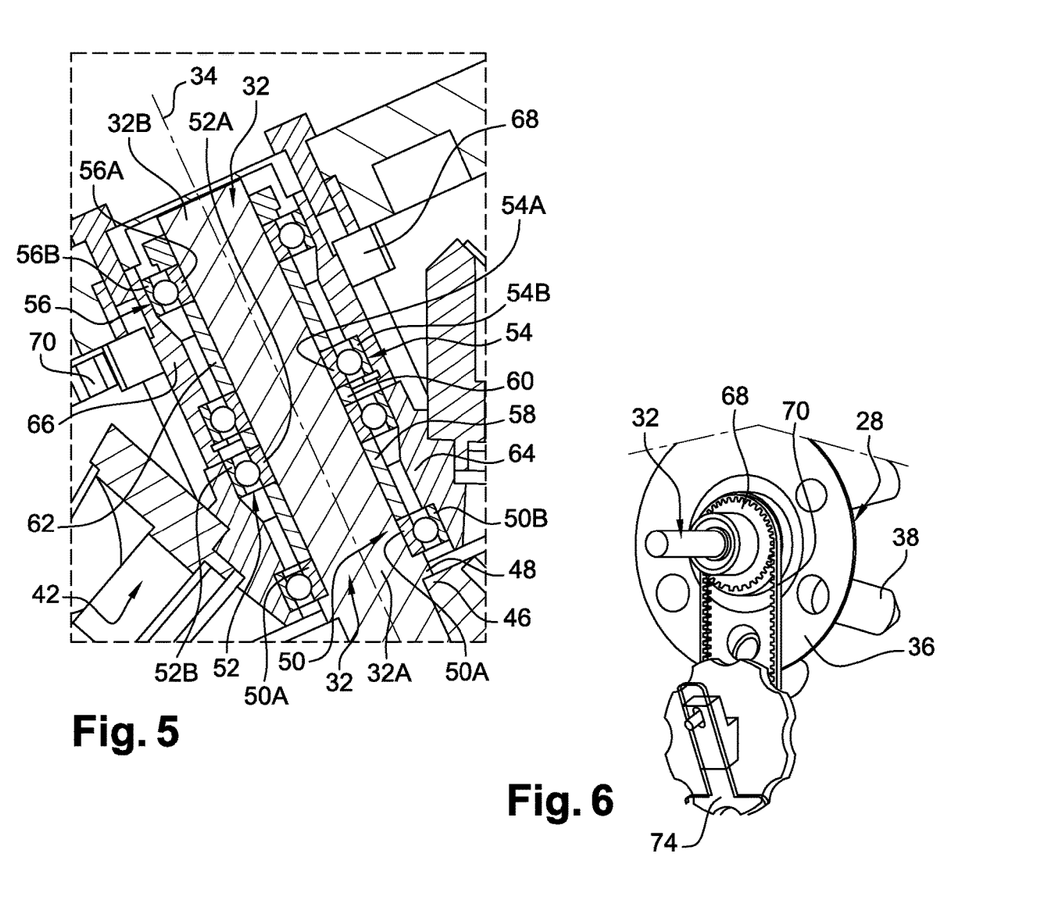
FIG. 5 is a larger-scale view of the delimited zone, as a dotted line, in FIG. 4.
FIG. 6 is a schematic, perspective view of the first turret and the mechanism thereof for driving in rotation around the pivot.

The pivot 32 comprises two lower 32A and upper 32B ends. The lower end 32A of the pivot 32 is inserted and secured in an orifice of the base 46 secured to the base 18 of the frame 14 (FIGS. 4 and 5). The pivot 32 comprises an annular groove 48 forming a stop for inserting the lower end 32A of the pivot 32 into the base 46.

The first turret 28 and the second turret 30 are each guided in rotation by a first 50, 54 and a second 52, 56 rolling bearing, more specifically ball bearings. Each of the bearings 50, 52, 54, 56 comprises an inner annular ring 50A, 52A, 54A, 56A secured to the fixed pivot 32 and an outer annular ring 50B, 52B, 54B, 56B intended to rotate with a turret 28, 30. The first bearing 50 of the lower turret 30 is supported by way of the inner ring 50A thereof by the annular groove 48 and is spaced apart from the inner ring 52A of the second bearing 52 by an inner annular spacer 58 applied on the pivot 32 and separating the inner annular rings 50A, 52A of the first and second bearings 50, 52 of the lower turret 30. An annular wedge 60 is inserted between the second bearing 52 of the second turret 30 and the first bearing 54 of the first turret 28. More specifically, this wedge 60 is in contact with the inner rings 52A, 54A of the bearings 52, 54 only. Another inner annular spacer 62 is inserted between the rings 54A, 56A of the first bearing 54 and of the second bearing 56 of the first turret 28 or upper turret.

More specifically, the plate 40 of the lower turret 30 comprises a central opening making it possible for the mounting of the plate 40 around the pivot 32. The radially inner peripheral edge 64 of the plate 40, delimiting the central opening, is mounted as a stop on the outer annular ring 50A of the first bearing 50 of the first turret 30, in the direction of the base 48 and the upper end of said peripheral edge 64 is arranged with an axial clearance opposite the lower end of a ring 66 surrounding the first 54 and the second 56 bearings of the upper turret 28. The inner peripheral edge 64 of the plate 40 of the lower turret 30 is secured in rotation to the outer rings 50A, 52A of the first and second bearings 50, 52 of the second turret 30 and the ring 66 is secured in rotation to the outer rings 54A, 56A of the first 54 and second 56 bearings of the first turret 28. The plate 36 of the upper turret 28 is secured by screwing on the upper annular end of the ring 66.

Thus, when functioning, the first turret 28 can rotate independently of the second turret 30, but remains secured axially to it, i.e. along the axis 34 of the pivot 32.

The positioning in rotation of each of the first turret 28 and the second turret 30, achieved on one same fixed pivot 32, makes it possible to guarantee a good relative positioning between the filtering modules 42 and the objective lenses 38. Also, the possible impacts on the frame 14 of the microscope 10 do not induce any misalignment of the objective lenses 38 relative to the filtering modules 42.

As can be seen in FIGS. 4 to 6, a star wheel 68 is mounted around and coupled in rotation with the support ring 66 of the plate 36 of the upper turret 28. This star wheel 68 is taken with a transmission belt 70 also taken with another star wheel 72 of a roller 74 supported in rotation on a pin 76 secured to the frame 14. This pin 76 extends along an axis 78 substantially parallel to the axis of the pivot 32. The roller 74 is provided to be accessible from the outside of the microscope when the cowling elements are in position on the chassis 14.

Figures 7, 8, 9:
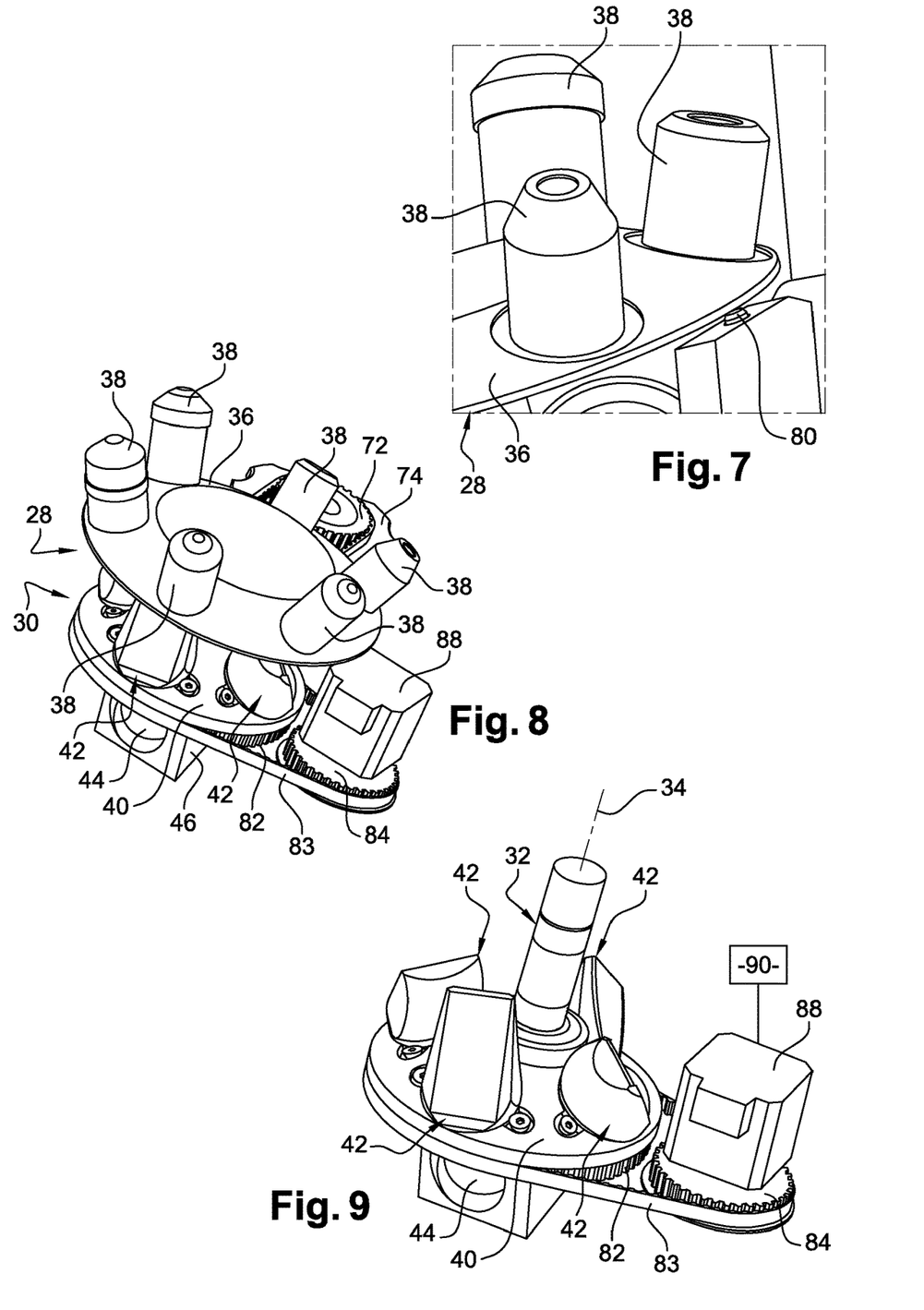
FIG. 7 is a schematic view of the indexing of the first turret around the pivot.
FIG. 8 is a schematic, perspective view of the first turret and of the second turret with the mechanism for driving the second turret.
FIG. 9 is a schematic, perspective view of the second turret only and of the mechanism thereof for driving around the pivot.

FIG. 7 shows the cooperation between the outer periphery of the plate 36 of the first turret 28 and the frame 14 in order to achieve an indexing in rotation of the first turret 28 on the frame 14 in each of the positions of use thereof of the objective lenses 38. To this end, the outer periphery comprises a plurality of concave cavities (not represented) cooperating with a ball plunger 80 supported by the frame 14, the ball being intended to be housed in a concave cavity of the plate 36 thus making it possible to achieve a retention of the plate 36 of the first turret 28 in an active position.

Figure 2:
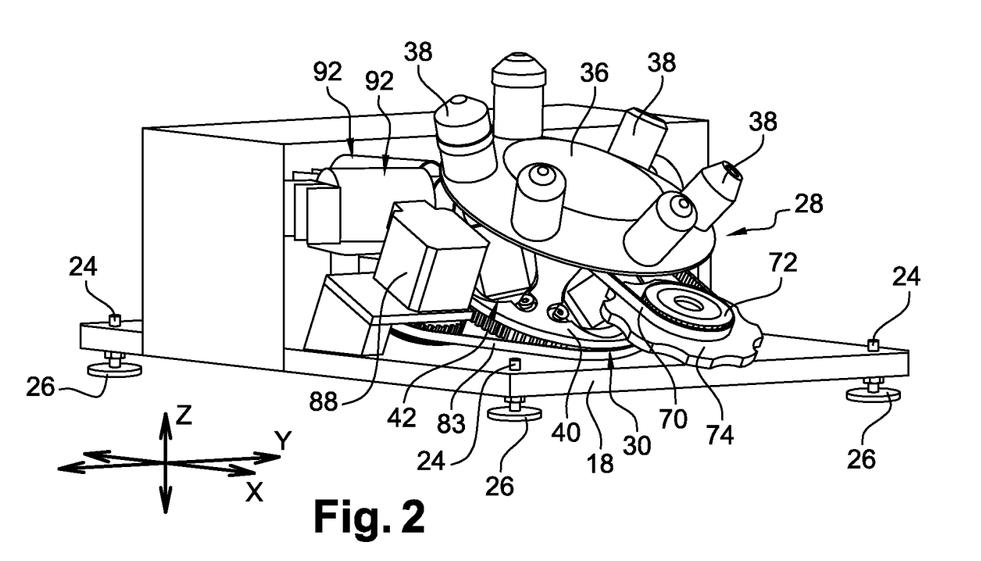
FIG. 2 is a schematic, perspective view, from the side and from the front, from the inside of the microscope according to the invention.
Figure 3:
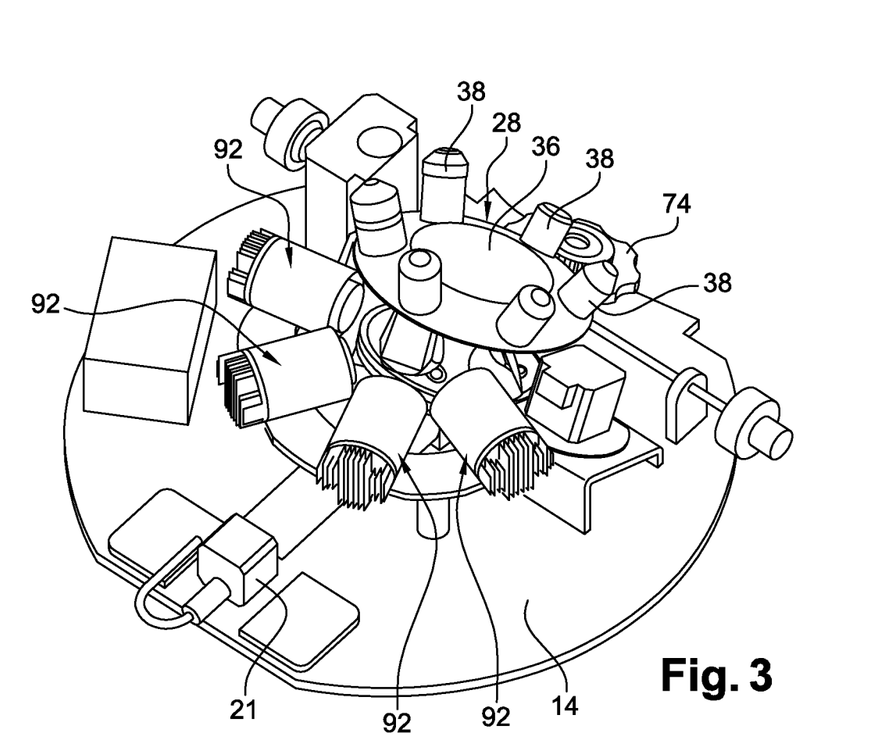
FIG. 3 is a view, similar to that of FIG. 2, from the rear and from the top.

The outer peripheral edge of the plate 40 of the second turret 30 comprises a gearing 82 taken with a belt 83, which is also taken with a star wheel 84 supported by an axis of the motorised means 88 connected to the control means 90 which are also capable of controlling the functioning of the lighting means 92 as will appear below in the description (FIGS. 2, 8 and 9).

Figure 11A:
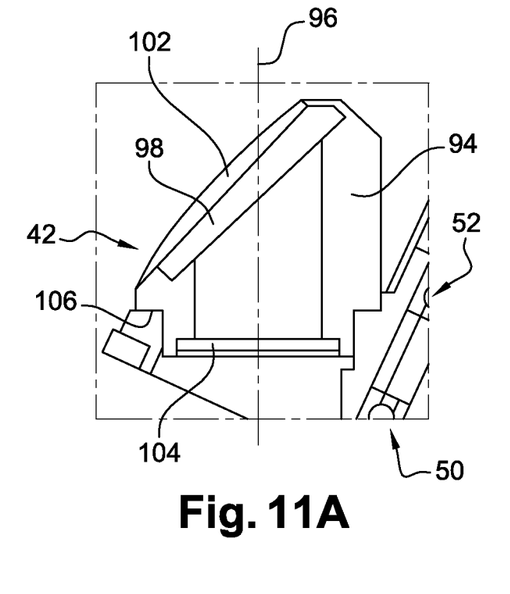
FIG. 11A is an isolated, schematic, cross-sectional view of a filtering module.
Figure 11B:
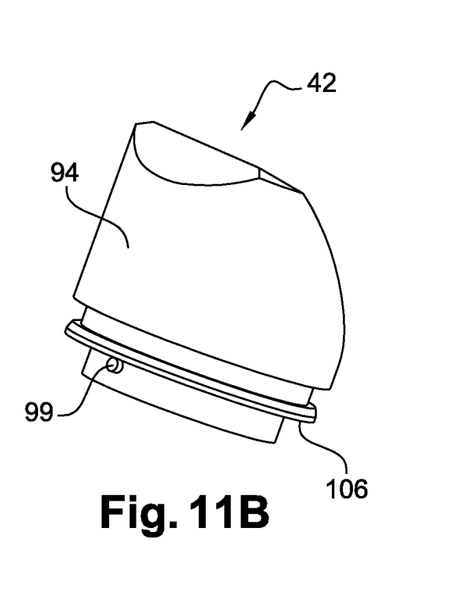
FIG. 11B is a schematic, perspective view of a filtering module.

Each filtering module 42 comprises a tubular casing 94 of axis 96 comprising a first opening 98 and a second opening 100 arranged at the ends of the tubular casing 94 and passed through by the axis 96 of the casing 94 of the filtering element 42. The first opening 98 houses a dichroic filter 102 of which the property is to be selective in reflection and in transmission. Thus, such a dichroic filter 102 is capable of reflecting specific wavelengths and is capable of letting other specific wavelengths pass. The second opening 100 houses an emission filter or rejector filter 104 of a specific wavelength corresponding to the excitation wavelength, more specifically the excitation wavelength of the associated lighting module 92. The dichroic filter 102 of each filtering module 42 extends along a plane which is tilted obliquely with respect to the axis 96 of the casing 94 of the filtering module 42. The emission filter 104 of each filtering module 42 extends along a plane which is substantially perpendicular to the axis 96 of the casing 94. It will be noted, that in an active position of use, the axis 96 of each filtering module 42 is in the optical path.

Figure 10:
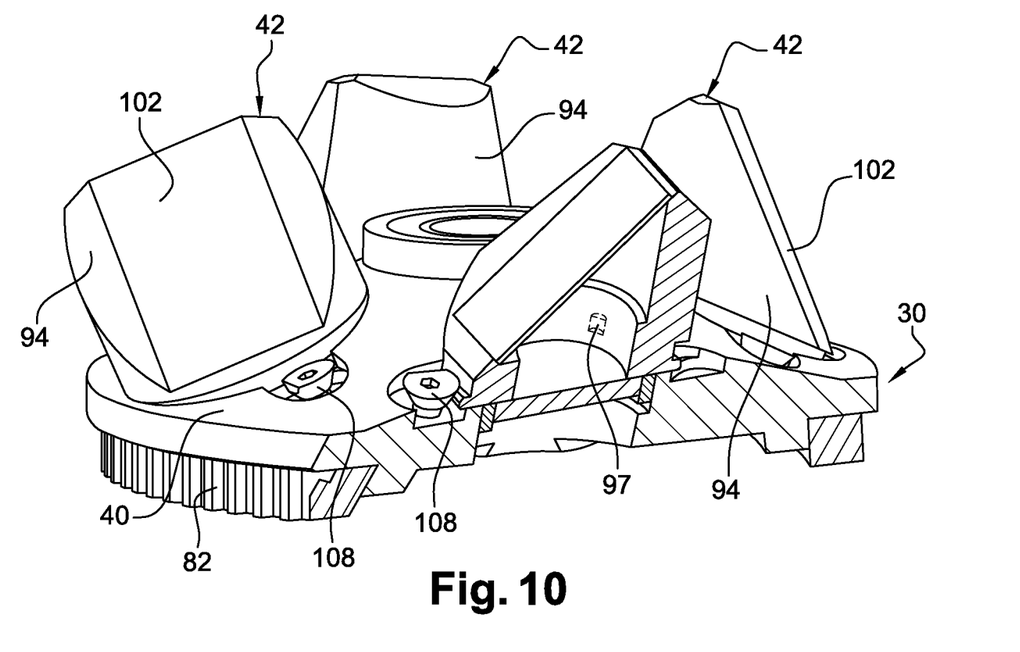
FIG. 10 is an isolated, schematic, perspective view of the second turret.

Also, each filtering module 42 comprises an outer annular shoulder 106 forming a mounting stop of the module 42 in an opening of the plate 40 (FIG. 11A). Each module 42 comprises indexing means in rotation about the axis 96 in an opening of the plate 40 of the second turret 30 (FIG. 11B). The indexing means comprise a groove 97 leading to the opening and wherein a pin 99 is capable of being inserted (FIGS. 10 and 11B). The plate 40 comprises means for locking 108 the module in an opening of the plate 40 of the second turret 30. These locking means comprise two screws 108 with offset heads, arranged on either side of a module 42, and bearing by rotation against the casing 94 of the module 42.

Figure 12:
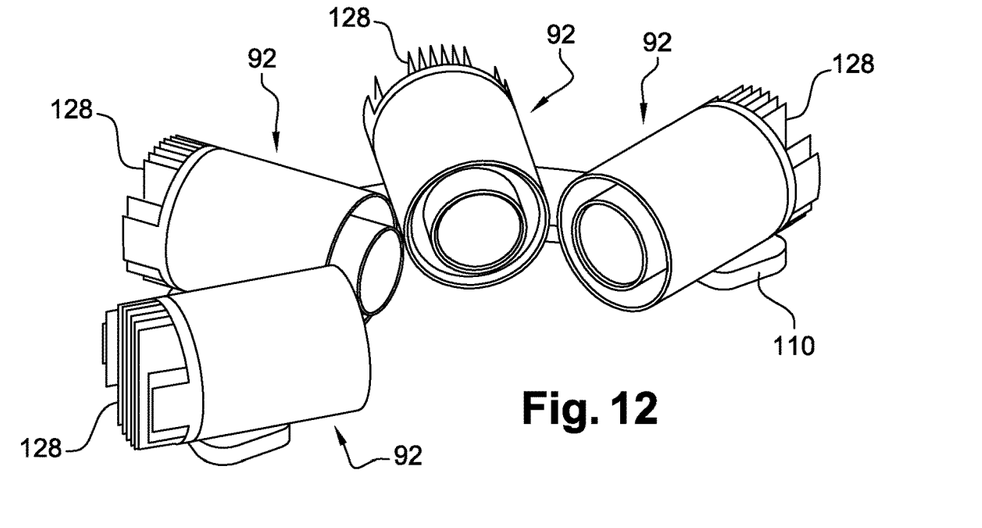
FIG. 12 is a schematic, perspective view of the lighting means.

The lighting means of the microscope according to the invention comprise a plurality of lighting modules 92 supported by a deck 110 in the shape of a circular arch, secured to the frame 14 (FIG. 12). The lighting modules 92 are positioned so as to emit an incident light beam in the direction of a filtering module 42 which sends the light back through the dichroic filter 102 thereof towards an objective lens 38 up to a sample. The light emitted by the sample passes through the objective lens then the filtering module 42 and is reflected by the reflective surface 44 supported by the base 46 towards a detector 21 and then displayed on the viewing screen 12.

The lighting modules 92 are configured to emit light beams, of which the wavelengths are different and each lighting module 92 is associated with one single filtering module 42. Thus, for each given couple associating a lighting module 92 with a filtering module 42, it is understood that the dichroic filter 102 of the filtering module 42 is capable of sending back the wavelength of the incident beam towards an objective lens 38 up to a sample and that the transmission properties of the dichroic filter 102 make it possible to transmit the wavelength emitted by the sample, the emission filter 104 being provided to absorb the incident light.

Because of the use of fixed lighting modules 92, a lighting module 92 and the associated filtering module 42 are positioned against one another such that the beam of said lighting module 92 is sent back by the dichroic filter 102 of said filtering module 42 towards a sample, when said filtering module 42 and an objective lens 38 are in an active position corresponding to a position of use. It is thus understood, that the dichroic filters 102 of the filtering modules 42 are not all oriented identically about the axis of rotation 34 of the second turret 30.

The use of fixed lighting modules 92 makes it possible to position them very precisely on the frame 14, which facilitates the orientation of the beam of each of the lighting modules 92 towards the filtering modules 42. In addition, the use of lighting modules 92, structurally independent of the filtering modules 42, makes it possible to facilitate the interventions of a user.

In the embodiment example represented in the figures, the microscope 10 comprises four filtering modules 42 and four lighting modules 92, a lighting module 92 cooperating with a given filtering module 42 as stated above.

Figures 13, 14:
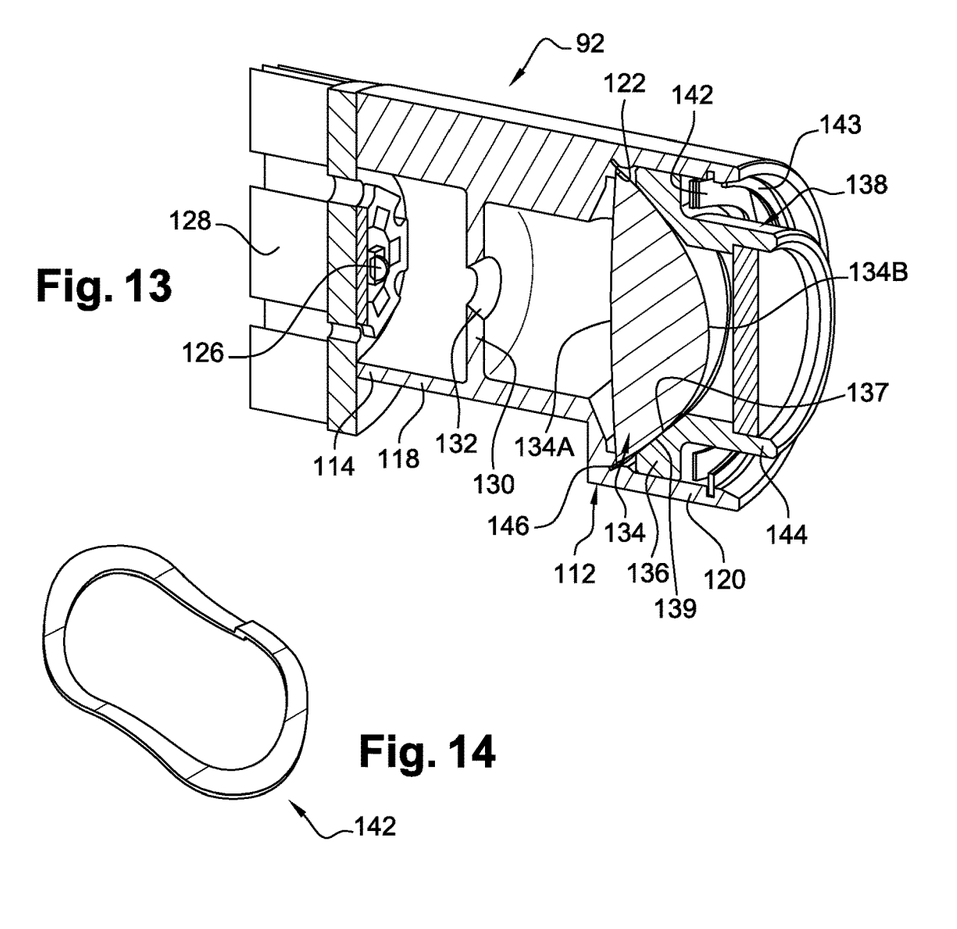
FIG. 13 is a schematic, perspective and cross-sectional view of a lighting module according to the invention.
FIG. 14 is a schematic view of a spring washer integrated in the lighting module of FIG. 13.

Each lighting module 92 comprises a tubular body 112 comprising a first upstream end 114 and a second downstream end 116 (FIG. 13). This tubular body 112 is formed of a first part 118 and a second part 120. The first part 118 and the second part 120 have a substantially cylindrical inner shape and define at the junction thereof, an annular shoulder. The inner diameter of the first part is less than the inner diameter of the second part 120. The first end 114 of the body 112 supports a light source 126, of the semi-conductive type, secured to a thermal dissipater 128, the light source 126 being capable of emitting a beam in the direction of a diaphragm 130 housed in the first part 118 of the body 112. The diaphragm 130 comprises a truncated opening 132 flaring in the direction of the second part 120 of the body 112. The diaphragm 130 is advantageously formed of one single part with the first part 118 are represented in FIG. 13. A converging lens 134 is inserted from the second end 116 of the body 112 on the annular shoulder 122 of the second part 120 of the body 112. It comprises a substantially flat upstream face 134A and a convex downstream face 134B on which is applied an annular segment 136 or spacer of a bandpass filter 140 support 138 which is fitted by an elastic member 142. The spacer 136 of the filter support 138 comprises a concave, curved annular surface 137, complementary to the convex, curved annular surface 139 portion on which it is intended to come into contact so as to obtain a surface against surface support. An axial stop split ring 143 of the elastic member is mounted in a groove of the second end 116 of the body 112 and axially locks the axially pre-stressed elastic member. As represented in FIG. 14, the elastic member 142 is a metal washer having ripples along the axis of the washer in the circumferential direction. The annular segment 136 of the filter support 138 is thus applied on the convex face 134B of the lens 134 by the elastically pre-stressed elastic member 142.

The annular segment 136 of the support 138 is connected downstream to a cylindrical sleeve 144 of which the free end, i.e. opposite the lens 134 supports a bandpass filter 140, termed excitation filter, making it possible to specifically select the wavelength band of the lighting source, exiting from a lighting module 92.

The mounting of the filter 140 on a cylindrical sleeve 144 surrounded by an elastic member 142 for holding the spacer 136 of the support 138 and by the stop ring 143 of the elastic member 142 makes it possible to assemble the different elements of the lighting module 92 simply and quickly while guaranteeing an optimal compactness of the lighting module 92.

As can be seen in FIG. 13, the radially outer periphery of the lens 134 is inserted in a truncated cross-sectional groove 146 flaring upstream or towards the first end 114 of the body 112. This configuration makes it possible to limit the mechanical stresses applied to the mounting and the fitting onto the lens 134.

In an embodiment not represented in the figures, the microscope 10 according to the invention could be used to produce a white light lighting, this light thus being emitted from the top of the objecting-carrying table through the sample. A phase contrast ring could be inserted between the source and the object-carrying table.

The lighting means could also be capable of emitting a white light beam in the direction of a beam splitter supported by the second turret. The lighting means can then thus comprise a specific lighting module supported by the deck which cooperates with a given filtering module supporting in the first opening, the beam splitter.

The invention claimed is:

1. A microscope for observing a sample comprising a first turret supporting a plurality of objective lenses and a second turret supporting a plurality of filtering modules, the first turret and the second turret being supported by one same pivot and mounted in rotation, independently from one another, around this pivot, each objective lens of the first turret and each filtering module of the second turret being capable of being arranged by rotation of the first turret and of the second turret in an active position wherein a filtering module of the second turret is interleaved in an optical path between an objective lens of the first turret and a detector, and wherein the lighting means comprise a plurality of fixed lighting modules configured to emit light beams of which the wavelengths are different.

2. The microscope according to claim 1, wherein an axis of the pivot is tilted obliquely with respect to a vertical in a position of use of the microscope.

3. The microscope according to claim 2, wherein the second turret is arranged below the first turret.

4. The microscope according to claim 1, wherein each turret is guided in rotation around the pivot by two rolling bearings supported by the pivot.

5. The microscope according to claim 4, wherein the second turret comprises a support plate of the filtering modules mounted around the first and second bearings of the second turret and the first turret comprises a support plate of the objective lenses fixed on a ring surrounding the first and second associated bearings.

6. The microscope according to claim 1, wherein each filtering module comprises a casing comprising a first opening and a second opening such that a light emitted by the sample passes through the first opening then the second opening, the casing of each filtering module supporting a dichroic filter arranged in the first opening and suitable for reflecting the light emitted by the lighting means towards an objective lens and making it possible for the light of a predetermined wavelength to pass through the dichroic filter.

7. The microscope according to claim 6, wherein each filtering module comprises an emission filter capable of rejecting the wavelength of the light source, this emission filter being arranged in the second opening.

8. The microscope according to claim 6, wherein the lighting means comprise a plurality of fixed lighting modules configured to emit light beams of which the wavelengths are different, wherein each lighting module is associated when functioning with one single filtering module, a lighting module and the associated filtering module being positioned against one another such that a beam of said lighting module is sent back by the dichroic filter from said associated filtering module towards an objective lens of the first turret, when said associated filtering module and the objective lens are in an active position.

9. The microscope according to claim 1, wherein the lighting modules are positioned on a circular-shaped deck and which is secured to a frame of the microscope.

10. The microscope according to claim 1, wherein each lighting module comprises a tubular body comprising a light source at a first end and a lens inserted from a second end opposite the first end on an annular shoulder inside the body, a filter support being fitted onto the lens by an elastic member axially pre-stressed and axially locked by a stop ring of the second end of the body.

11. The microscope according to claim 1, wherein the second turret is controlled in rotation by motorised means actuated by means for controlling the active positioning of a filtering module, these controlling means being capable of functioning a given lighting module.

12. The microscope according to claim 1, wherein a rotating roller is coupled in rotation with the first turret, for example by a transmission belt.

13. The microscope according to claim 1, wherein each filtering module is mounted so that they can be removed on the second turret.

14. The microscope according to claim 1, comprising a sample-carrying table arranged above the first turret.

* * * * *